United States Patent [19]

Falconer

[11] Patent Number: 4,961,491

[45] Date of Patent: Oct. 9, 1990

[54] THREE MASS VIBRATORY FEEDER

[75] Inventor: Thomas H. Falconer, Erie, Pa.

[73] Assignee: Eriez Manufacturing Company, Erie, Pa.

[21] Appl. No.: 406,963

[22] Filed: Sep. 13, 1989

[51] Int. Cl.⁵ .............................................. B65G 27/24
[52] U.S. Cl. ..................................... 198/761; 198/769
[58] Field of Search ......................... 198/769, 761, 762

[56] References Cited

U.S. PATENT DOCUMENTS

| | | | |
|---|---|---|---|
| 2,280,056 | 4/1942 | Broekhuysen | 198/769 |
| 2,333,338 | 11/1943 | Rapp | 198/609 |
| 2,353,492 | 7/1944 | O'Connor | 74/61 |
| 2,819,788 | 1/1958 | Howard | 198/609 |
| 2,918,590 | 12/1959 | Gilbert | 198/769 X |
| 3,087,603 | 4/1963 | Petrea | 198/769 X |
| 3,158,256 | 11/1964 | Torrey et al. | 198/769 X |
| 3,627,112 | 12/1971 | Smith | 198/769 |
| 3,703,233 | 11/1972 | Hacker | 198/769 X |
| 3,786,912 | 1/1974 | Taylor | 198/769 |
| 4,378,064 | 3/1983 | Brown | 198/769 |
| 4,921,090 | 5/1990 | Gregor | 198/769 X |

FOREIGN PATENT DOCUMENTS 61-75716 4/1986 Japan .................................. 198/769

*Primary Examiner*—Joseph E. Valenza
*Assistant Examiner*—Cheryl L. Gastineau
*Attorney, Agent, or Firm*—Charles L. Lovercheck; Wayne L. Lovercheck; Dale Lovercheck

[57] ABSTRACT

A three mass vibratory conveyor including a base with an electromagnet, a tray supported on the base and a tuning weight. A first spring connecting the tray to the base, a second spring connecting the base to the tuning weight and a resilient support supporting the base to a support member. The mass of the tuning weight being adjustable to provide a system in which the base and tray are driven by the driver at a predetermined frequency and no relative motion takes place between the base and the tray.

15 Claims, 2 Drawing Sheets

THREE MASS VIBRATORY FEEDER

BACKGROUND OF THE INVENTION

This invention relates to vibratory feeders and more particularly to three mass electromagnetic vibratory feeders.

REFERENCE TO PRIOR ART

Electromagnetic vibratory feeders are used to move mechanical parts or bulk material, such as coal, along an elongated trough from a supply point to a discharge point. Frequency tuned two mass systems consist of a trough mass connected by springs to a base mass. Usually, this two mass system is then suspended by isolators from a rigid structure.

The feeder is driven by an electromagnet, either of the pulsed or alternating current type. One part of the electromagnet, designated the coil assembly, is fastened rigidly to the base while the other portion of the electromagnet, designated the armature, is fastened rigidly to the trough. The positioning of these components can be interchanged. The armature could be attached rigidly to the base and the coil assembly could be rigidly attached to the trough. Upon energizing the coil, both masses will undergo motion.

It is known to provide three mass vibratory systems, such as shown in U.S. Pat. Nos. 2,353,492 issued to O'Connor; 2,895,064 issued to Hoff and assigned to Eriez Manufacturing Company; 3,786,912 issued to Taylor; 4,117,381 issued to Pereny; 4,007,825 issued to Spurlin et al and 4,378,064 issued to Brown.

Applicant has discovered that an improvement on the prior art can be accomplished by attaching a third mass by means of springs to the base mass. With proper selection of these springs and a third mass, the deflection of the base can be brought to near zero. A number of advantages are gained by bringing the base deflection to near zero. First, forces transmitted through any isolators supporting the base mass to the building structure are brought to near zero. Second, the deflection of the trough and third mass is independent of the values of the base mass. Therefore, its mass can be minimized. Third, the air gap of the electromagnetic motor does not have to be of such a value as to accommodate the deflection of the base mass since the base mass no longer moves. Therefore, the deflection of the trough can be increased for greater feeder capacity. Fourth, the air gap could be made smaller and the mass of the trough increased so that greater, larger troughs can be employed.

OBJECTS OF THE INVENTION

It is an object of the invention to provide an improved three mass vibratory feeder.

Another object of the invention is to provide a three mass vibratory feeder that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
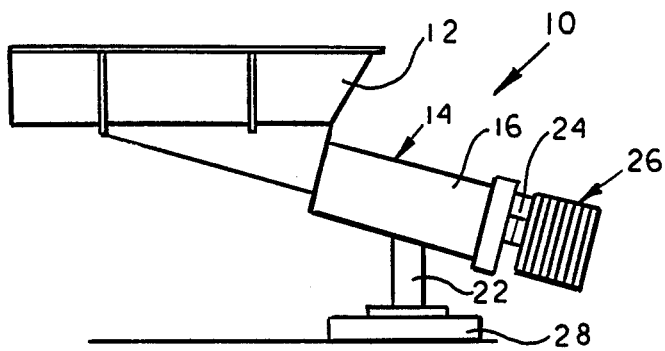
FIG. 1 is a side view of a feeder according to the invention.

Now with more specific reference to the drawings, feeder 10 shown is of a type familiar to those skilled in the art and is made up basically of a three mass system, having tray 12, base 14, electromagnet 16, tuning weight 26 and associated springs 20, 21 and 24. Tray 12 is supported on base 14 by means of first spring 20 and second spring 21. Base 14 is supported on support member 28 by resilient isolator support means 22 and 23 which may be resilient isolation mounts, soft springs or a combination of both which have an insignificant effect on the operation of feeder 10 and play an insignificant role in its operation.

First spring 20 and second spring 21 have spring constants K1 and may be made of leaf springs such as third spring 24. Base 14 is connected to tuning weight 26 by third spring 24 which has spring constant K2.

Armature 18 is fixed to tray 12 and has first leg 36 and second leg 38 and may be a permanent magnet or an electromagnet excited by direct current. Tray 12 and armature 18 comprise first mass M1.

Electromagnet 16 acts as the driving means for feeder 10 and is excited by AC current which may be 60 hertz for example and is magnetically associated with armature 18. Electromagnet 16 is attached rigidly to the base assembly and together comprise second mass M2. Electromagnet 16 has first leg 30, second leg 32 and intermediate leg 34 spaced from one another. The space between first leg 30 and intermediate leg 34 of electromagnet 16 receives first leg 36 of armature 18. The space between second leg 32 and intermediate leg 34 of electromagnet 16 receives second leg 38 of armature 18. Electromagnet 16, through armature 18, applies a substantially longitudinal force on tray 12, alternately in one direction and then in the other direction with the alternations of the current in the solenoid of electromagnet 16.

Figure 2:
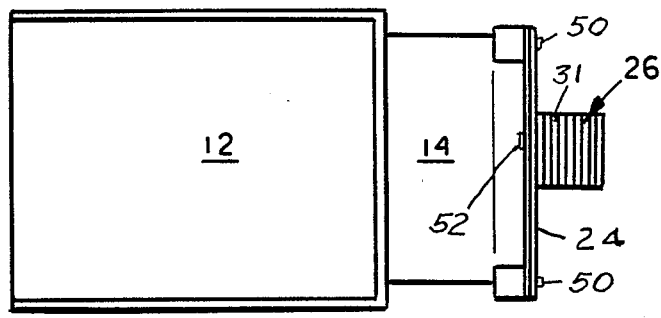
FIG. 2 is a top view of the feeder shown in FIG. 1.
Figure 3:
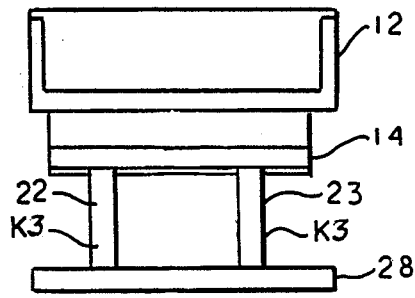
FIG. 3 is a front end view of the feeder.
Figure 4:
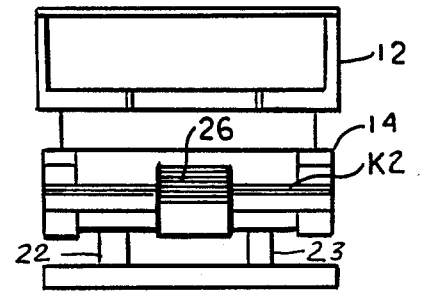
FIG. 4 is a rear end view of the feeder.
Figure 5:
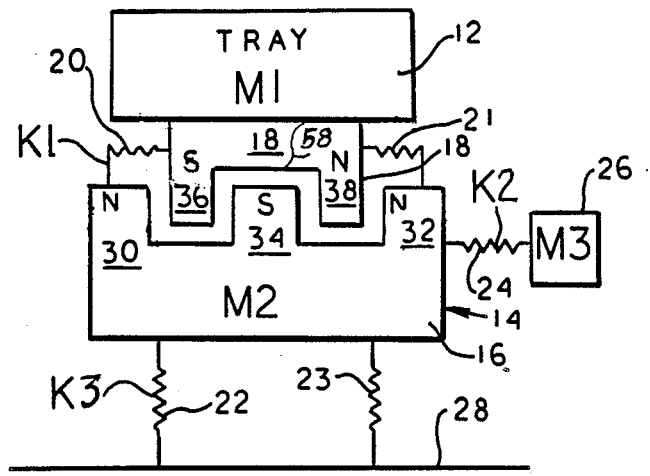
FIG. 5 is a schematic diagram view of the feeder shown in FIGS. 1 through 4.
Figure 6:
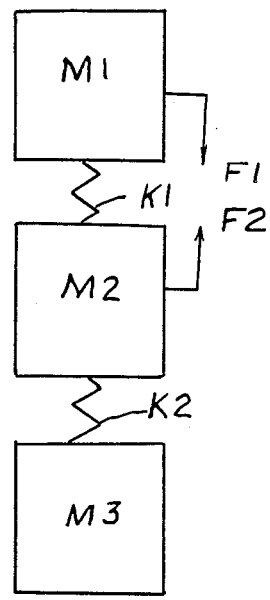
FIG. 6 is a schematic diagram of the masses, spring constants and forces according to the invention.

Third spring 24 may be a leaf spring made of stacks of leaves as shown in FIG. 4 having their ends clamped to base 14 at positions 50 and their intermediate part clamped to tuning weight 26 at position 52 as shown in FIG. 2. Springs 20 and 21 could be leaf springs, like the springs shown in U.S. patent application Ser. No.195,862, now U.S. Pat. No.4,880,106 filed on May 19, 1988 by Thomas H. Falconer, et al and assigned to Eriez Manufacturing Company and allowed by the U. S. Patent and Trademark Office on July 28, 1989, helical springs or any other resilient body. Leaf springs, like third spring 24, provide deflection in bending while providing vertical support for tuning weight 26 on base 14. Likewise, first spring 20 and second spring 21 provide the necessary support for tray 12 on base 14, as well as providing the necessary spring action for vibrating tray 12 on base 14.

Tuning weight 26 may be made of a stack of metal plates or elements 31 clamped together, some of which can be removed or others added to adjust the value of third mass M3 for tuning purposes. By adjusting the mass of tuning weight 26 and/or the spring rate of springs 24, or springs 20 and 21 the relative movement of base 14 to fixed support 28, can be reduced substantially to zero.

The operation of a three leg electromagnet with an a.c. coil and a permanent magnet armature is described in U.S. Pat. No. 2,895,064 which is assigned to Eriez Manuafacturing Company.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A feeder with a tray comprising a first mass and a base including a drive means,
    said base comprising a second mass,
    a tuning weight having a third mass,
    a first spring means having a first spring constant connecting said tray to said base,
    a second spring means having a second spring constant connecting said base to said tuning weight,
    said drive means being fixed to said base and operatively associated with said tray for applying a force of alternating direction and predetermined frequency to said tray whereby said tray vibrates relative to said base and said base remains substantially in a fixed position.

2. The feeder recited in claim 1 wherein said first spring means provides vertical support means for said tray on said base and said second spring means provides vertical support for said tuning weight on said base.

3. The feeder recited in claim 1 wherein resilient isolation support means is provided for supporting said base on a support member.

4. The feeder recited in claim 1 wherein said driving means includes an electromagnet fixed to said base and a magnetic armature fixed to said tray.

5. The feeder recited in claim 2 wherein an armature is fixed to said tray and said armature and said tray comprise said first mass.

6. The feeder recited in claim 5 wherein said armature is a permanent magnet.

7. The feeder recited in claim 4 wherein said electromagnet has a core and a winding,
    said core having a first leg, a second leg and an intermediate leg.

8. The feeder recited in claim 7 wherein said armature has a first leg and a second leg,
    said first leg of said armature being disposed between said first leg of said core and said intermediate leg of said core,
    said second leg of said armature being disposed between said second leg of said core and said intermediate leg of said core.

9. The feeder recited in claim 1 wherein said tuning weight has at least one removable weight element which can be removed or added for adjusting said third mass of said tuning weight to reduce the movement of said base relative to a fixed support member.

10. The feeder recited in claim 9 wherein said removable weight element comprises a plurality of metallic plates removably held together.

11. A three mass vibratory feeder comprising:
    a tray, a base, a tuning weight and electromagnetic driving means for vibrating said tray relative to said base,
    a first resilient means connecting said tray to said base and a second resilient means connecting said base to said tuning weight,
    said electromagnetic driving means comprising an armature and an electromagnet,
    said base and said electromagnet being fixed together and comprising a second mass,
    said tray and said armature being fixed together and comprising a first mass,
    said tuning weight comprising a third mass and being adjustable whereby substantially no relative motion occurs between said base and a fixed support when said tray is vibrated by said electromagnetic driving means.

12. The feeder recited in claim 11 wherein said armature is a permanent magnet.

13. The feeder recited in claim 11 wherein said armature is a DC electromagnet.

14. The feeder recited in claim 11 wherein said second resilient means is a leaf spring having a first end, a second end and an intermediate part,
    said ends of said resilient means being fixed to said base and said intermediate part of said first resilient means being fixed to said tuning weight.

15. The feeder recited in claim 11 wherein isolation support means is provided between said base and a support member.

* * * * *